(12) United States Patent
Oogjen et al.

(10) Patent No.: US 8,057,763 B2
(45) Date of Patent: Nov. 15, 2011

(54) PROCESS FOR RECOVERING GROUP VIB METALS FROM A CATALYST

(75) Inventors: Bob Gerardus Oogjen, Almere (NL); Harmannus Willem Homan Free, Hoevelaken (NL); Johannes Cornelis Sitters, Amersfoort (NL)

(73) Assignee: Albemarle Netherlands B.V., Amsterdam (NL)

( * ) Notice: Subject to any disclaimer, the term of this patent is extended or adjusted under 35 U.S.C. 154(b) by 1047 days.

(21) Appl. No.: 11/855,894

(22) Filed: Sep. 14, 2007

(65) Prior Publication Data

US 2008/0131343 A1 Jun. 5, 2008

Related U.S. Application Data

(60) Provisional application No. 60/844,505, filed on Sep. 14, 2006.

(51) Int. Cl.
*C22B 1/00* (2006.01)
(52) U.S. Cl. .... 423/55; 423/58; 423/593.1; 423/594.13; 502/305; 502/306; 502/311; 502/312; 502/313; 502/315; 502/316; 502/314
(58) Field of Classification Search .............. 423/53–61, 423/593.1, 594.13; 502/305, 306, 311–316
See application file for complete search history.

(56) References Cited

U.S. PATENT DOCUMENTS

| | | | |
|---|---|---|---|
| 4,075,277 A | | 2/1978 | Castagna et al. |
| 4,298,581 A | | 11/1981 | Douglas et al. |
| 4,300,952 A | * | 11/1981 | Ingelstrom et al. .............. 75/238 |
| 4,401,631 A | | 8/1983 | Canavesi et al. |
| 4,454,098 A | | 6/1984 | Scheithauer et al. |
| 4,629,503 A | | 12/1986 | Fruchter et al. |
| 4,666,685 A | | 5/1987 | Wiewiorowski et al. |
| 4,737,187 A | | 4/1988 | Hahn et al. |
| 4,753,916 A | * | 6/1988 | Carcia et al. .................. 502/321 |
| 5,192,365 A | * | 3/1993 | Modly .......................... 106/439 |

FOREIGN PATENT DOCUMENTS

| | | |
|---|---|---|
| DE | 148 522 | 5/1981 |
| EP | 0 487 379 B1 | 5/1992 |
| EP | 0 666 108 A1 | 8/1995 |
| JP | 52052896 A | 4/1977 |
| JP | 54097598 A | 8/1979 |
| RU | 2 190 678 C1 | 10/2002 |
| RU | 2190678 * | 10/2002 |
| WO | WO 00/41810 A1 | 7/2000 |
| WO | WO 00/41811 A1 | 7/2000 |
| WO | WO 2004/073859 A1 | 9/2004 |
| WO | WO 2005/103206 A1 | 11/2005 |
| WO | 2007/048594 * | 5/2007 |

OTHER PUBLICATIONS

Z. R. Llanos, et al; "Processes for the Recovery of Metals From Spent Hydroprocessing Catalysts"; Third International Symposium on Recycling of Metals and Engineered Materials; Edited by P.B. Queneau and R.D. Peterson; 995; p. 425-447; The Minerals, Metals & Materials Society.

* cited by examiner

*Primary Examiner* — Steven Bos
(74) *Attorney, Agent, or Firm* — Jeremy J. Kliebert

(57) ABSTRACT

The invention relates to a process for recovering Group VIB metals from a catalyst, in particular a spent bulk catalyst, comprising one or more Group VIB metals and one or more Group VIII metals. Further, the invention relates to a solid Group VIB metal compound obtainable by the process according to the invention having the general formula $H_2XO_4$, wherein $X=W_{1-y}Mo_y$, wherein y is between 0 and 1 and to its use in a process for the manufacture of a fresh catalyst. The process comprises the steps of:

a) oxidizing the one or more Group VIB metals to one or more Group VIB metal oxides;
b) separating the one or more Group VIB metal oxides from the one or more Group VIII metals;
c) dissolving the one or more Group VIB metal oxides in water to produce an aqueous solution of one or more Group VIB metal oxides;
d) precipitating the one or more Group VIB metal oxides from the aqueous solution by adding alkaline earth metal (Group IIa) ions to the aqueous solution;
e) optionally filtering and washing the precipitate; and
f) transforming the precipitate by adding an acid to form a solid metal compound comprising one or more Group VIB metals.

46 Claims, No Drawings

PROCESS FOR RECOVERING GROUP VIB METALS FROM A CATALYST

The invention relates to a process for recovering Group VIB metals from a catalyst, in particular a spent bulk catalyst, comprising one, preferably two or more Group VIB metals and one or more Group VIII metals. Further, the invention relates to a solid Group VIB metal compound obtainable by the process according to the invention and to its use in a process for the manufacture of a fresh catalyst.

It is well known that catalysts slowly deactivate during use due to the build up of contaminants from the substrate on the catalyst. In particular, hydroprocessing catalysts for reducing sulphur, nitrogen, aromatic compounds and/or metals in a hydrocarbon feed, hereafter referred to as hydrodesulphurisation (HDS), hydrodenitrogenation (HDN), or hydrodearomatization (HDA) and/or hydrodemetallization (HDM) deactivate mainly because of a progressive build up of coke deposits on and/or in the catalyst. Because the metals in such spent catalysts are very expensive and often environmentally hazardous, spent catalysts are typically regenerated for their re-use in the same or similar processes.

The problem underlying the instant invention is that known regeneration processes cannot be applied to spent bulk catalysts because the high temperatures normally used for removing the contaminants has deleterious effects on the bulk catalysts. As an alternative to regeneration, there is provided according to the instant invention, a process for recovering Group VIB metals from a catalyst, in particular a spent bulk catalyst, comprising one or more Group VIB metals and one or more Group VIII metals, that results in a recycled compound comprising one or more Group VIB metals that can be used in a process for the manufacture of a fresh catalyst.

U.S. Pat. No. 4,298,581 discloses a process for recovering refractory metals, in particular chromium, vanadium, molybdenum and tungsten from secondary resources such as alloy scrap comprising refractory metals and base metals such as cobalt, nickel, iron and copper. The process comprises the steps of oxidizing the refractory metals with sodium carbonate in air to convert the refractory metals to their oxides, dissolving the oxides in water and separating from the solution the insoluble base metal oxides. The refractory metal oxides are precipitated by addition of calcium ions producing a solids mixture of calcium carbonate, calcium sulphate and calcium salts of the refractory oxides. The solids are subsequently treated with sulphuric acid and peroxides to dissolve the refractory metal oxide peroxy-complexes and to separate the precipitated solids calcium sulphate and/or calcium carbonate. The refractory metal oxides solution is then further processed in several steps to separate the molybdenum and the tungsten in a hydrated tungsten oxide ($WO_3$) product and an ammoniated, hydrated molybdenum oxide ($MoO_3$) product.

The disadvantage of the prior art process is that it is very complex because it is designed to be able to recycle a wide variety of metals from alloy scrap. Such a process would not be economic for catalyst recycling. Further, catalysts, in particular bulk catalysts, comprise a relatively high amount of very expensive Group VIB metals and it is therefore much more important to achieve a very high recovery yield. More importantly, the prior art process does not produce, in any stage of the recycling process, a product that is suitable for reuse in a process for the manufacture of a catalyst. It was found that the catalytic activity of a fresh catalyst is very sensitive to the presence of impurities. The requirements for the reuse of recycled metal compounds in a process for the manufacture of a catalyst are therefore much higher than the requirements for the use for making alloys. The impurities/contaminant level must be very low. Therefore (spent) catalyst recycling back to metal compound feedstock has thus far never been used.

U.S. Pat. No. 4,629,503 describes a process for the recovery of tungsten from cemented tungsten carbide or tungsten alloy scrap. The process comprises the steps of disintegrating the tungsten containing material in a melt comprising sodium nitrate followed by addition of calcium chloride to precipitate calcium tungstate and transforming the calcium tungstate by addition of hydrochloric acid to crystalline tungstic acid. The obtained tungstic acid is substantially free of calcium ions and has a crystalline structure that is important to avoid adsorption of metal impurities. DD 148522 similarly describes a process for the manufacture of tungstic acid from tungsten containing scrap. The process comprises the steps of disintegrating the tungsten containing scrap with alkali nitrate or nitrite, leaching in water to dissolve the alkali tungstate, precipitating the tungstate with calcium chloride to form calcium tungstate, washing and drying of the precipitate, followed by calcination and transforming with hydrochloric acid to produce tungstic acid.

U.S. Pat. No. 4,075,277 describes a process for recovering molybdenum from molybdic acid from waste products, in particular from spent supported catalysts. The process comprises treating the catalyst with an aqueous solution of sodium carbonate, baking the treated catalyst at temperature between 600° C. to 800° C. to convert the molybdenum to sodium molybdate, dissolving the molybdate by washing in water, and adding nitric acid to convert the sodium molybdate and to precipitate molybdic acid. The disadvantage of this process is that it has a low metal recovery yield. Apart from environmental problems, this process is unattractive because of the high metal prices. Further, a sulphur removal step is not described. Using an excess of sodium carbonate as suggested would in a sulphur-containing spent catalyst result in excess sulphate production, which is undesired in view of the envisaged use of the recycled molybdic acid compound in a fresh catalyst manufacturing process.

European Patent No. EP 0 487 379 describes a process for the recovery of metals from a refining catalyst comprising at least one base metal from the group formed by nickel, cobalt and iron and at least one refractory metal chosen from the group vanadium, tungsten and molybdenum, said process comprising the steps of oxidizing, treating the catalyst in the presence of caustic soda at elevated temperature, contacting with water, separating the precipitated base metals from the filtrate containing soluble sodium salts of the metals vanadium, tungsten, molybdenum and aluminium.

This publication does not describe how to arrive at a recycled metal compound that can be used in a process of for the manufacture of a catalyst. In particular, the publication does not describe the requirements for the recycled metal compounds for use in a process for the manufacture of fresh catalyst, nor is described how to separate the group IIa ions, in particular calcium ions from the recovered calcium-metal salts.

Llanos and Deering in Third International Symposium on recycling of metals and engineered materials edited by P. B. Queneau and R. D. Peterson, the minerals, metals and materials Society 1995, page 425-447, describes a review of numerous processes both industrial and experimental for the recovery of molybdenum, vanadium, the metal, cobalt and aluminium from spent hydrotreating or hydrodesulphurisation catalysts. It is described that none of the facilities described in the publication can tolerate tungsten because it contaminates the molybdenum products. One of the processes described herein comprises roasting the spent catalyst with soda ash, leach with water to dissolve molybdenum oxides and acidify to precipitate molybdic acid. The molybdic acid is converted to 98% pure molybdic trioxides.

U.S. Pat. No. 4,737,187 describes a process for recovering nickel and vanadium from nickel and vanadium containing petroleum residue solids. The process comprises melting the residue in the presence of preferably sodium carbonate, transforming the resulting melt material with a sulphur carrier to a nickel melt and a vanadium containing solid slag which is then separated from the melt. It is further described that, the vanadium containing slag can be oxidizing and leached with water to recover the vanadium.

Accordingly, the instant invention provides an economic process for the recycling of Group VIB metals from spent catalyst or reject catalyst (off-spec fresh catalyst), in particular for such catalysts comprising at least two Group VIB metals, with a high recovery yield of Group VIB metals and that produces a recycled Group VIB metal compound that can be used directly in a process for the manufacture of a fresh catalyst, i.e., it is not necessary to further purify the recycled Group VIB metal compound before using it in a process for the manufacture of a fresh catalyst.

According to a preferred embodiment of the invention there is provided a process for recovering Group VIB metals from a bulk catalyst, in particular spent bulk catalyst, comprising one or more Group VIB metals and one or more Group VIII metals, said process comprising the steps of:

a. Oxidizing to convert the one or more Group VIB metals to metal oxides,
b. Separating the Group VIB metal oxides from the one or more Group VIII metals,
c. Dissolving the Group VIB metal oxides in an alkali water to produce an aqueous solution of one or more Group VIB metal oxides,
d. Precipitating the one or more Group VIB metal oxides from the aqueous solution by adding alkaline earth metal (Group IIa) ions, preferably calcium ions, to the aqueous solution of the one or more Group VIB metal oxides,
e. Optionally filtering and washing the precipitate, and
f. Transforming the precipitate by addition of an acid to form a solid metal compound comprising one or more Group VIB metals.

Although the processes according to the invention can also be applied for the recycling of spent supported catalyst, the invention is, as described above, particularly suitable for the recycling of spent bulk catalyst. A bulk catalyst is defined as being an unsupported catalyst formed from aggregated mixed metal oxide particles. The process can also be applied to fresh or regenerated catalyst that has been rejected for whatever reason (hereafter referred to as reject catalyst) or to a mixture of spent and reject catalyst. Unless specified otherwise, the description of recycling spent catalyst also includes recycling of reject catalyst.

The process of the invention is particularly suitable, in a particularly preferred embodiment, when applied to a bulk catalyst comprising two group VIB metals, preferably tungsten and molybdenum, which process results in a solid metal acid compound comprising said two Group VIB metals. The solid metal acid compound can be a single mixed metal acid compound or a mixture of tungsten and molybdenum acid compounds. It has been found that the recycled solid metal compound obtained in the process of the present invention is very suitable for use directly, i.e. without further purification or transformation steps, in a process for the manufacture of a bulk catalyst. In particular, the obtained recycle compound is very suitable for a process for the manufacture of a bulk catalyst wherein the recycled compound is used as the solid compound in a solid-solid or solid-solute bulk catalyst preparation route as here after described in more detail.

In the process of the present invention, the spent bulk catalyst may also comprise only one group VIB metal, which process then results in a recycle metal acid compound comprising only one group VIB metal. Preferably, the spent bulk catalyst comprises essentially only Ni and/or Co as the group VIB metal, and essentially only tungsten or molybdenum as the group VIB metal.

The spent bulk catalyst may further comprise other metal compounds either as a component, for example as a promoter metal, in the original fresh bulk catalyst or as contaminants originating from the hydrocarbon feed. Promoter metals that may optionally be present are, for example, group V metals, such as niobium. Possible metal contaminants from the feed can for example be vanadium, iron or chromium. Iron can be separated from the bulk catalyst together with the group VIII metals without further adaptation of the recycling process. In case the spent catalyst comprises arsenic, nickel, chromium, vanadium, or other group V metals, the recycling process preferably comprises one or more separate process steps known in the art for the removal of said metals (for example in U.S. Pat. No. 4,298,581). If present, the spent bulk catalyst preferably comprises a minor amount of group V metals, preferably less then 10 mole percent relative to the total amount of group VIII or group VIB metals.

Spent bulk catalysts typically comprise at least 40 wt % of the one or more Group VIB metals and one or more Group VIII metals (calculated as metal oxide relative to the total weight of the catalyst, not including contaminants) and 0.1 to 60 wt % of one or more materials selected from the group of binder materials, conventional hydroprocessing catalysts, cracking compounds, acidic promoters or mixtures thereof. Suitable bulk catalysts comprising at least one group VIII metal and at least two group VIB metals, in particular nickel/molybdenum/tungsten based catalysts are described in WO 2000/041810, WO 2004/073859, WO 2000/041811 and WO 2005/103206.

The process according to the invention has two preferred alternative routes to arrive at the aqueous solution of one or more group VIB metal oxides. Both routes involve oxidation to remove any contaminant carbon and sulphur compounds and to convert the Group VIB metal compounds to metal oxides, separating the Group VIB metal oxides from the Group VIII metal compounds, and dissolving the oxidized Group VIB metal oxides in an aqueous solution. The alternative routes differ in that in one route (referred to as the dissolution route) a solid phase of the Group VIII metal compounds is separated from an aqueous liquid phase of the Group VIB metal oxides, and in the other route (referred to as the melt route), a solid phase of the Group VIII metal compounds is separated from a solid phase of the Group VIB metal oxides.

In the melt route, a sulphur containing spent catalyst is oxidised by roasting with an alkali compound, preferably alkali carbonate (such as sodium carbonate), at a temperature of at least about 600° C., preferably at least about 800° C. to about 1000° C., forming a Group VIB alkali metal oxide solid and a group VIII metal sulphide liquid melt that phase-separates based on the liquid density differences of the two liquid phases. After the melt is cooled and solidified, the solid Group VIB alkali metal oxide is physically separated from the solid group VIII metal sulphide. The solid Group VIB metal oxides are subsequently dissolved in an alkali water solution to produce the aqueous solution of the one or more Group VIB metal oxides.

The above separation process requires sulphur to produce the group VIII metal sulphide liquid melt. Therefore, the bulk catalyst is preferably a spent bulk catalyst in sulphidic form. In case the spent catalyst does not comprise sulphur, sulphur can be added for example by addition of $Na_2S$.

It has been found that it is advantageous to carefully adjust the amount of sulphur in the spent catalyst to match the molar amount of the Group VIII metal. Preferably, the amount of sulphur is chosen sufficiently high such that the amount of residual non-sulfided group VIII metal, such as nickel, in the slag is preferably less than about 3 wt %, more preferably less than about 2 wt % and most preferably less than about 1 wt % (calculated as metal oxide). On the other hand, the amount of sulphur is should not be too high as to cause a contamination of sulphate after the oxidation step. Metal sulphate interferes because it co-precipitates with the Group VIB metals later in the process, specifically after the addition of the Group IIa ions to the aqueous solution of Group VIB metal oxides. The amount of metal sulfate after the Group IIa precipitation step should be less than about 1 wt %, preferably less than about 0.75 wt %, more preferably less than about 0.5 wt % (relative to total solids of the precipitate).

If sulphidic spent catalyst is employed in the process of the present invention, the amount of sulphur content in the sulphidic spent bulk catalyst can be reduced during oxidation. Alternatively, the amount of sulphur can be reduced by mixing sulphidic spent catalyst with oxidic catalyst, such as reject catalyst and/or with sulphidic spent catalyst that has been more completely oxidized. Oxidation can be done in general by an oxidizing agent. Preferably, the oxidisation is done by employing an oxygen containing gas, preferably air, at a temperature preferably below about 750° C., more preferably below about 700° C. and even more preferably below about 680° C. The oxidation temperature should be controlled to prevent sublimation of metal compounds, in particular molybdenum oxide ($MoO_3$).

In the dissolution route bulk catalyst is first oxidised to remove the majority, and preferably all of the sulphur and organic contaminants at elevated temperature in the presence of an oxidizing agent and to bring the Group VIB and Group VIII metals in the oxidic state. In this process the oxidation is preferably done in an oxygen containing gas, preferably air, at a temperature preferably below 680° C. for reasons described above. The obtained Group VIB and Group VIII metal oxides are then contacted with an aqueous solution of an alkali hydroxide, preferably sodium hydroxide, at elevated pH to form an aqueous solution with dissolved Group VIB metal compounds and precipitated Group VIII metal compounds.

In both the melt and dissolution routes, an aqueous Group VIB alkali metal oxide solution is formed wherein the Group VIB metal oxides may be in the form of molybdates, tungstates, and/or other states, which is then preferably further oxidised with an oxidizing agent, preferably hydrogen peroxide. It has been found that this additional oxidation step is advantageous to further oxidize residual sulphuric and organic contaminants.

Preferably, the additional oxidizing agent is added to the Group VIB metal oxide solution to convert the Group VIB metals to the highest oxidation state. It has been found that this significantly improves the yield of metal recovery. The oxidizing agent is preferably added to a Group VIB metal oxides solution in such amount that essentially all metals are in the highest oxidation state. A further advantage of this oxidation is that residual nickel and contaminant metals like iron are precipitated as iron oxide and nickel hydroxide and can be removed by filtration.

The spent bulk catalyst may comprise silica or alumina as support material in supported catalysts or as additive in bulk catalysts. In the preferred case of bulk catalysts the amount of silica is normally relatively low, typically preferably below about 40 wt % relative to the total weight of the spent catalyst (not including contaminants). Further, silica may accumulate as contaminants in the catalyst during hydroprocessing. It has been found advantageous in view of the metal recovery yield to remove the silica present in the spent catalyst. Therefore, the process according to the invention preferably further comprises a silica removal step wherein the pH of the obtained Group VIB alkali metal oxide solution is lowered by addition of an acid to a pH between about 7 and about 11, most preferably between about 8 and about 10 to precipitate silica, and at a temperature between about 50° C. to about 95° C., preferably between about 60° C. to about 90° C. and most preferably between about 70° C. to about 85° C. The precipitated silica is removed by filtration after this step or at a later stage together with other solids formed in previous steps, in particular residual Group VIII oxides like iron oxide and nickel hydroxide. The pH range should be adjusted to sufficiently precipitate the silica without the risk of also precipitating and losing Group VIB metals (in particular tungstic acid) to the waste stream. If the pH is too high the silica is insufficiently removed. It has been found that this is particularly undesirable because it would make the recycled metal compound less suitable for use as starting material in a process for the manufacturing of a fresh bulk catalyst. It is believed that the silica makes highly soluble heteropolyacid complexes with the group VIB metals causing considerable loss of group VIB metals. It is therefore preferred that the silica is removed such that the residual amount of silica in the precipitated Group VIB metal oxides cake obtained (in step d) is less than about 1.5%, preferably less than about 1%, more preferably less than about 0.75%, and most preferably less than 0.5 wt % (relative to the mass of the precipitated cake).

In both the dissolution and the melt route it is preferred that the silica precipitation step occurs after the oxidation step because then less acid is required to adjust the pH, in particular here the amount of acid to reduce the pH is relatively low.

In the precipitation of the Group VIB metal oxides cake (in step d), Group IIa (alkaline earth metal) ions, preferably calcium ions, are added to the Group VIB alkali metal oxide solution. The Group IIa metal ions can be added as chlorides, nitrate, and the like. The addition forms precipitated Group VIB metal salts, for example calcium molybdate and calcium tungstate. Other Group IIa ions, for example Ba and Be may also be employed. In view of obtaining a high metal recovery yield, it is preferred that the amount of Group IIa ions is chosen in a molar excess relative to the Group VIB alkali metal oxides. Acceptable yields are obtained when using an excess of at least about 5 mol %. In view of obtaining a high metal recovery yield the excess is preferably at least about 10 mol %, more preferably at least about 15 mol %, even more preferably at least about 20 mol % and most preferably at least about 25 mol %. The molar excess of Group IIa ions is preferably chosen such that the total amount of unprecipitated Group VIB metals in the filtrate is preferably less than about 200 ppm, more preferably less than about 100 ppm. At these levels it is not necessary to have a separate Group VIB metal recovery unit, for example in an ion exchange column, which is an advantage for both economic and environmental reasons.

During the precipitation (in step d) the pH of the solution is preferably at least about 8 for the complete precipitation of tungstates, and for precipitation of molybdates, optionally in combination with tungstates, more preferably at least about 9 and even more preferably at least about 10.

Because in the melt route described above, it is preferred to use an excess of sulphur to get optimum removal of the one or more Group VIII metals, the obtained Group VIB metal solution will, after the oxidation step, contain sulphates. By consequence, choosing an excess of Group IIa metal ions in the precipitation step d) will result in Group IIa metal sulphate precipitation. This precipitate may create a problem as it can cause clogging of the filters in the filtration and washing steps. This problem can be sufficiently accommodated while obtaining a very high metal recovery yield by choosing the molar excess of the Group IIa metal between about 10 and about 25%. The metal recovery yield of between about 99.5% and 99.9% can be obtained.

Another embodiment of the process according to the invention further comprises a washing step wherein the precipitate is washed with a base, preferably an alkali hydroxide, to convert Group IIa sulphates to Group IIa hydroxides. The advantage is that this Group IIa hydroxide precipitate does not clog downstream filters and, in the subsequent acid transforming step, can be completely dissolved and washed out by filtration. The precipitate from step d) can be further washed with or without addition of an alkali hydroxide to remove any other remaining cations.

In the acid transforming step, the Group VIB precipitate is transformed by addition of an acid to form a solid metal compound comprising the Group VIB metals. Preferably, the acid is a protic acid with an anion that does not precipitate with Group IIa metals and does not form highly water-soluble complexes with Group VIB metals. Preferably hydrochloric acid or nitric acid is used. Nitric acid is preferred over hydrochloric acid because it does not require special corrosion resistant equipment.

After the acid transforming step, the product is preferably filtered and washed. The filtrate may be recycled to recover the Group IIa metals.

The processes of the present invention can obtain a recovery of greater than about 90% or even more than about 95% of Group VIB metals. However, since the solids need to be washed and the pH may increase, some metal may be lost in the washing step. By recycling the supernatant the metal recovery yield can be improved.

In view of the envisaged use of the obtained solid Group VIB metal compound in a process for the manufacture of fresh catalyst, after the washing step, the Group IIa metal content in the obtained solid metal compound should be below about 5 wt %, preferably below about 3 wt %, more preferably below about 2 wt %, even more preferably below about 1.5 wt % and most preferably below about 1.0 wt % or even below about 0.5 wt % (calculated as oxide relative to the total weight of the Group VIB metal compound). It has been found that the resulting solid Group VIB metal compounds, in particular when having a Group IIa metal content below about 2 wt % is very suitable for direct use as raw material in a process for the preparation of a fresh catalyst, in particular a bulk catalyst.

It is preferred that in one embodiment of the process, the transforming step, the one or more filtration steps, one or more basic washing steps and optional intermediate reslurrying steps are all done in a single piece of filter equipment, preferably a Nutsche filter.

The obtained solid metal compound is optionally dried at a temperature below about 120° C., preferably below about 100° C. to a water content preferably between about 5 and about 70 weight percent, preferably between about 30 and about 60 wt % and most preferably between about 40 and about 50 wt % (as determined by loss on ignition drying at a temperature above about 600° C.). The drying temperature was found to be critical in view of the suitability in the envisaged use as raw materials for a fresh catalyst preparation. The mild drying conditions avoid the risk of forming Group VIB metal oxides that are not sufficiently reactive and are effectively lost in a fresh bulk catalyst preparation process.

Another embodiment of the present invention also relates to a solid metal raw material compound comprising one or more Group VIB metals that is obtainable by the process according to the embodiments described above, and having the general formula $H_2XO_4$, wherein $X=W_{1-y}Mo_y$, wherein y is between 0 and 1. In particular, the invention relates to a solid metal raw material compound comprising two or more Group VIB metals. Optionally, the recycled solid metal compound may still comprise Group V metal, such as niobium or vanadium.

A preferred form of the solid metal raw material compound for its use in fresh bulk catalyst manufacturing is as a slurry comprising between about 5 and about 70 wt. % water, more preferably between about 30 and about 60 wt % and most preferably between about 40 and 50 wt % (as determined by drying at a temperature above about 600° C.). This slurry can be used directly in the manufacture of a fresh catalyst.

Alternatively, the solid metal raw material compound can be in a dried form that is more easy to handle and transport, comprising preferably at least about 7.5 wt % water in case y=0 and preferably at least about 11 wt % water in case y=1, but in either case preferably less than about 30 wt %. The minimum water content is to avoid the risk of forming Group VIB metal oxides.

Another embodiment of the present invention relates to a process for the manufacture of a fresh catalyst, in particular hydrotreatment bulk catalyst, using the solid metal raw material compound described above, preferably comprising both tungsten and molybdenum as the Group VIB metals. It is preferred that in this process nickel carbonate is reacted with a solid metal acid compound, preferably comprising tungsten and molybdenum as the Group VIB metals. Preferably, in this process the pH is between about 4.5 and about 7.5. The advantages of this pH range is that there is a minimum loss of metals, in particular a pH higher than about 4.5 is chosen in view of reducing nickel loss and a pH below about 7.5 is chosen in view of reducing the molybdenum loss. Preferably the pH range is between about 5 and about 7. The obtained metal compound has a relatively high acidity and because of that can be used without separate pH adjustments in combination with a basic Group VIII raw material, preferably nickel hydroxide.

In the most preferred embodiment for the process for the manufacture of a bulk catalyst the solid metal raw material compound of one or more Group VIB metals is reacted in the presence of a protic solvent, while remaining at least partly in the solid state during the entire reaction time, with dissolved or undissolved Group VIII metal containing compounds. Alternatively, the solid metal compound of one or more Group VIB metals according to the invention can also be dissolved, preferably in ammonium or hydrogen peroxide, combined in solution with Group VIII metal containing compounds and (co-)precipitated.

The invention claimed is:

1. A process for recovering one or more Group VIB metals from a catalyst having one or more Group VIB metals and one or more Group VIII metals, the process comprising the steps of:

a) oxidizing the one or more Group VIB metals to one or more Group VIB metal oxides, b) separating the one or more Group VIB metal oxides from the one or more Group VIII metals, c) dissolving the one or more Group VIB metal oxides in water to produce an aqueous solution of one or more Group VIB metal oxides, d) precipitating the one or more Group VIB metal oxides from the aqueous solution by adding alkaline earth metal ions to the aqueous solution, e) optionally filtering and washing the precipitate, and f) transforming the precipitate by adding an acid to form a solid metal compound comprising one or more Group VIB metals.

2. The process of claim 1 wherein the catalyst is a bulk catalyst.

3. The process of claim 1 wherein the alkaline earth metal ions are calcium ions.

4. The process of claim 2 wherein the bulk catalyst comprises two Group VIB metals and results in a solid metal compound comprising the two Group VIB metals.

5. The process of claim 4 wherein the two Group VIB metals are tungsten and molybdenum.

6. The process of claim 2, wherein the bulk catalyst comprises only tungsten as the only Group VIB metal.

7. The process of claim 2 wherein the bulk catalyst further comprises a Group V metal.

8. The process of claim 7 wherein the Group V metal is niobium or vanadium.

9. The process of claim 2 wherein the bulk catalyst comprises nickel as the Group VIII metal, and tungsten and molybdenum as the Group VIB metals.

10. The process according to claim 2, wherein bulk catalyst is a spent bulk catalyst comprising at least 40 wt % of the one or more Group VIB metals and one or more Group VIII metals and 0.1 to 60 wt % of one or more materials selected from the group of binder materials, other hydroprocessing catalysts, cracking compounds, acidic promoters or mixtures thereof.

11. The process of claim 1 wherein the catalyst is a sulphur containing spent catalyst and wherein the catalyst is:

a) oxidized by roasting with an alkali compound at a temperature of at least about 600° C. thereby forming a Group VIB alkali metal oxides and a Group VIII metal sulphides that phase-separate based on density difference, b) subsequently physically separating the Group VIB alkali metal oxides and a Group VIII metal sulphides that have phase separated, and c) dissolving the Group VIB alkali metal oxides in an alkali water solution to produce the aqueous solution of one or more Group VIB metal oxides of c).

12. The process of claim 11 wherein the alkali compound is sodium carbonate.

13. The process of claim 11 wherein the sulphur content in the spent catalyst is adjusted to match the molar amount of the Group VIB metal, such that the amount of residual Group VIII metal in the Group VIB alkali metal oxide is less than about 3 wt %.

14. The process of claim 13 wherein the sulfur containing spent catalyst is treated to reduce the sulphur content before the roasting step.

15. The process of claim 14 wherein the roasting is accomplished in an oxygen containing gas at a temperature below about 750° C.

16. The process of claim 15 wherein the gas is air.

17. The process of claim 13 wherein the sulfur containing spent catalyst is mixed with oxidic catalyst to reduce the sulphur content of the mixture.

18. The process of claim 17 wherein the oxidic catalyst is reject catalyst.

19. The process of claim 17 wherein the oxidic catalyst is second spent catalyst that has been oxidized separately from the first spent catalyst.

20. The process of claim 1 wherein the aqueous solution of the one or more Group VIB metal oxides is further oxidized with an oxidizing agent.

21. The process of claim 20 wherein the oxidizing agent is a peroxide.

22. The process of claim 20 wherein the oxidizing agent is added to the Group VIB metal oxides solution in such amount that essentially all group VIB metals are converted to the highest oxidation state.

23. The process of claim 2 further comprising the steps of first oxidizing the bulk catalyst at elevated temperature in the presence in of an oxidizing agent to remove sulphur and organic contaminants, contacting the obtained Group VIB and Group VIII metal oxides with an aqueous alkali hydroxide solution to form an aqueous solution of dissolved Group VIB metal compounds and solid Group VIII metal compounds, and physically separating the solid Group VIII metal compounds from the aqueous solution.

24. The process of claim 1 wherein the oxidizing is done in an oxygen containing gas at a temperature below about 680° C.

25. The process of claim 1 further comprising a silica removal step wherein the silica is precipitated by lowering the pH of the Group VIB alkali metal oxide solution obtained in d) by addition of an acid to a pH between about 7 and about 11 at a temperature between about 50 and about 95° C.

26. The process of claim 1 wherein the amount of alkaline earth metal ions is in a molar excess relative to the total of the Group VIB metal oxides.

27. The process of claim 26 wherein the amount of alkaline earth metal ions is at least in excess of about 5 mol % relative to the total of the Group VIB metal oxides.

28. The process of claim 26 wherein the molar excess of alkaline earth metal ions is such that the total amount of unprecipitated Group VIB metals is less than about 200 ppm.

29. The process of claim 1 wherein the pH during the precipitating is between about 7.5 and about 10.5.

30. The process of claim 1 further comprising a washing step wherein the precipitate is washed with an aqueous base.

31. The process of claim 30 wherein the aqueous base is an alkali-hydroxide.

32. The process of claim 31 wherein the amount of sulphate after the washing of the precipitate with an aqueous base is less than about 0.5 wt %.

33. The process of claim 1 wherein the acid in the transforming step is a protic acid with an anion that does not precipitate with the alkaline earth metal ions and does not form water soluble complexes with the Group VIB metals.

34. The process of claim 33 wherein the acid is hydrochloric acid or nitric acid.

35. The process of claim 33 wherein the precipitate is filtered and washed and the filtrate is recycled.

36. The process of claim 35 wherein c)-e) are all done in a single piece of filter equipment.

37. The process of claim 36 wherein the filter equipment is a Nutsche filter.

38. The process of claim 1 wherein the obtained solid metal compound has an alkaline earth metal content below about 5 wt %.

39. The process of claim 1 wherein the obtained solid metal compound is separated and dried under such mild conditions to prevent the conversion of Group VIB compound to a dehydrated oxidic state.

40. The process of claim 39 wherein the obtained solid metal compound is dried at a temperature below about 120° C.

41. The process according to claim 1 wherein the solid metal compound comprising one or more Group VIB metals that is recovered has the general formula $H_2XO_4$, wherein $X=W_{1-y}Mo_y$, and wherein y is between 0 and 1.

42. The process according to claim 41 wherein the solid metal compound comprises two or more Group VIB metals and optionally further comprises a Group V metal.

43. The process according to claim 41 wherein the solid metal compound has an alkaline earth metal content below about 3 wt %.

44. The process according to claim 41 further comprising reacting the solid metal compound of claim 41 in the presence of a protic solvent with dissolved or undissolved Group VIII metal containing compounds while remaining at least partly in the solid state during the entire reaction time thereby producing a fresh catalyst.

45. The process of claim 44 wherein the pH during the reacting is between about 4.5 and about 7.5.

46. The process according to claim 41 further comprising dissolving the solid metal compound of claim 41 in ammonium or hydrogen peroxide into solution with Group VIII metal containing compounds and subsequently precipitating a fresh catalyst.

* * * * *

UNITED STATES PATENT AND TRADEMARK OFFICE
CERTIFICATE OF CORRECTION

| | | |
|---|---|---|
| PATENT NO. | : 8,057,763 B2 | Page 1 of 1 |
| APPLICATION NO. | : 11/855894 | |
| DATED | : November 15, 2011 | |
| INVENTOR(S) | : Bob Gerardus Oogjen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Thirteenth Day of March, 2012

David J. Kappos
*Director of the United States Patent and Trademark Office*